United States Patent
Ozaki et al.

(10) Patent No.: US 8,900,757 B2
(45) Date of Patent: Dec. 2, 2014

(54) LITHIUM ION SECONDARY BATTERY

(75) Inventors: Ikuo Ozaki, Mito (JP); Yoshimasa Koishikawa, Hitachinaka (JP); Yoshihisa Okuda, Mito (JP); Yuki Takei, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 164 days.

(21) Appl. No.: 13/397,790

(22) Filed: Feb. 16, 2012

(65) Prior Publication Data

US 2012/0219855 A1    Aug. 30, 2012

(30) Foreign Application Priority Data

Feb. 25, 2011 (JP) ................................ 2011-040494

(51) Int. Cl.
| | |
|---|---|
| *H01M 4/24* | (2006.01) |
| *H01M 4/505* | (2010.01) |
| *H01M 4/525* | (2010.01) |
| *H01M 10/052* | (2010.01) |
| *H01M 4/02* | (2006.01) |
| *H01M 4/62* | (2006.01) |

(52) U.S. Cl.
CPC ............ *H01M 10/052* (2013.01); *H01M 4/505* (2013.01); *H01M 4/525* (2013.01); *H01M 2004/021* (2013.01); *H01M 4/02* (2013.01); *H01M 4/621* (2013.01); *Y02E 60/122* (2013.01)
USPC ................... 429/231.95; 429/217; 429/218.1; 429/223; 429/224

(58) Field of Classification Search
CPC ..... H01M 4/02; H01M 10/052; H01M 4/525; H01M 4/505; H01M 4/621; Y02E 60/122
USPC .............. 429/209, 211, 217, 218.1, 223, 224, 429/231.95, 232, 231.8
See application file for complete search history.

(56) References Cited

U.S. PATENT DOCUMENTS

| | | |
|---|---|---|
| 2001/0051300 A1 | 12/2001 | Moriguchi et al. |
| 2003/0082452 A1 | 5/2003 | Ueda et al. |

(Continued)

FOREIGN PATENT DOCUMENTS

| | | |
|---|---|---|
| JP | 11-307095 A | 11/1999 |
| JP | 2004-6275 A | 1/2004 |

(Continued)

OTHER PUBLICATIONS

JP Office Action of Appl. No. 2011-040494 dated Jun. 25, 2013 with English translation.

*Primary Examiner* — Mark F Huff
*Assistant Examiner* — Omar Kekia
(74) *Attorney, Agent, or Firm* — Antonelli, Terry, Stout & Kraus, LLP.

(57) ABSTRACT

A positive electrode capable of achieving both of high volumetric energy density and high volumetric power density and a lithium ion secondary battery using the same are provided. A lithium ion secondary battery includes a positive electrode including a current collector with a positive active material mixture layer applied on both faces thereof, the positive active material mixture layer including active material particles, conductive additive particles and a binder. The active material particles used have a value D of an average particle diameter D50 of the active material particles in the range from 1 to 10 μm. The ratio b/a of the volume fraction b of the vacancy volume in the positive active material mixture layer to the volume fraction a of the active material particles in the positive active material mixture layer is in the range of $-0.01D+0.57 \leq b/a \leq -0.01D+0.97$.

3 Claims, 4 Drawing Sheets

(56) References Cited

U.S. PATENT DOCUMENTS

| | | |
|---|---|---|
| 2005/0053833 A1 | 3/2005 | Hayashida et al. |
| 2005/0260496 A1 | 11/2005 | Ueda et al. |
| 2006/0051669 A1 | 3/2006 | Hayashida et al. |
| 2006/0134523 A1 | 6/2006 | Moriguchi et al. |
| 2007/0154812 A1 | 7/2007 | Moriguchi et al. |
| 2008/0121841 A1 | 5/2008 | Ueda et al. |
| 2009/0087731 A1 | 4/2009 | Fukui et al. |
| 2009/0181310 A1 | 7/2009 | Hayashida et al. |
| 2010/0248034 A1* | 9/2010 | Oki et al. .................... 429/231.8 |
| 2010/0323244 A1* | 12/2010 | Chiang et al. ................ 429/220 |
| 2011/0031437 A1 | 2/2011 | Nagase et al. |

FOREIGN PATENT DOCUMENTS

| | | |
|---|---|---|
| JP | 2004-192846 | 7/2004 |
| JP | 2006-278928 A | 10/2006 |
| JP | 2007-242570 A | 9/2007 |
| JP | 2007-273313 A | 10/2007 |
| JP | 2008-066040 A | 3/2008 |
| JP | 2008-120679 A | 5/2008 |
| JP | 2009-99523 A | 5/2009 |
| WO | WO 2009/128289 A1 | 10/2009 |

* cited by examiner

Conceptual drawing in 101

LITHIUM ION SECONDARY BATTERY

BACKGROUND OF THE INVENTION

1. Field of the Invention

The present invention relates to lithium ion secondary batteries to achieve both of high volumetric energy density and high volumetric power density.

2. Background Art

Lithium ion secondary batteries have been widely used mainly as power supplies for portable equipment such as a VTR camera, a laptop computer and a mobile phone. In recent years they are used in a variety of fields including video game machines, electrical power tools and electric bicycles.

Particularly in the automobile industry, electric vehicles with zero emission powered by a battery only as well as Hybrid Electric Vehicles (HEVs) and Plug-in Hybrid Electric Vehicles (PHEVs) powered by both of an internal-combustion engine and a battery are developed on a full scale basis to cope with environmental issues and partially have reached the stage of practical use. Therefore batteries as power supplies also are being developed actively.

In HEVs and PHEVs configured to assist the accelerating power of a vehicle with a motor, the battery thereof repeats instantaneous charge and discharge at a large current value of 10 C or higher while the vehicle is moving in most cases, although depending on a control method of the system. Therefore, the battery in such a vehicle is required to have high volumetric power density. Further, in order to downsize a battery or lengthen a traveling distance of a PHEV vehicle with one charge, the battery is required to have high volumetric energy density as well as high volumetric power density.

The charge/discharge reaction of a lithium ion secondary battery is performed in the vicinity of an interface between active material particles in electrodes and electrolyte solution flowing through a vacancy volume in the electrodes. For higher volumetric power density of a lithium ion secondary battery, the battery is required to have a sufficient reactive area between these active material particles and electrolyte solution and have a sufficient amount of electrolyte solution existing in the vicinity of active material particles secured to supply the electrolyte solution to a reactive face between the active material particles and the electrolyte.

Meanwhile, for higher volumetric energy density, the amount of active material particles incorporated into electrodes has to be increased. As one method to increase the amount of active material particles incorporated, the particle diameter and the particle shape of active material particles are controlled to minimize a vacancy volume between mixed particles for high-density filling so that more active material particles can be put in a fixed area (Patent Document 1: JP Patent Publication (Kokai) No. 2004-192846 A).

SUMMARY OF THE INVENTION

As described in the aforementioned Patent Document 1, electrodes have to be filled with more active material particles for higher volumetric energy density of a lithium ion secondary battery. Such high-filling density of active material particles in electrodes, however, causes the following problems. That is, the vacancy volume between mixed particles decreases, thus decreasing the reactive area between the active material particles and the electrolyte solution. Additionally, the vacancy volume between mixed particles is isolated, thus decreasing the amount of electrolyte solution that can be held in the vicinity of active material particles. Therefore, it is difficult to obtain a lithium ion secondary battery with high volumetric power density in this case and so to realize a lithium ion secondary battery to satisfy both of the requirements of high volumetric energy density and high volumetric power density sufficiently.

In view of the aforementioned problems of the conventional art, it is an object of the invention to provide a lithium ion secondary battery with high volumetric energy density and high volumetric power density.

In order to cope with the aforementioned problems, the structure recited in the claims of the present invention is used, for example. The present application includes a plurality of means to cope with the aforementioned problems, and according to one example thereof, preferably a lithium ion secondary battery includes a positive electrode including a current collector with a positive active material mixture layer applied thereon, the positive active material mixture layer including active material particles, conductive additive particles and a binder, and the active material particles used have a value D μm of an average particle diameter D50 of the active material particles in the range from 1 to 10 μm. The ratio b/a of the volume fraction b of the vacancy volume in the positive active material mixture layer to the volume fraction a of the active material particles in the positive active material mixture layer is in the range of $-0.01D+0.57 \leq b/a \leq -0.01D+0.97$. Additionally preferably a volume % c of a volume fraction of the conductive additive particles in the positive active material mixture layer is in the range of $-0.7D+13 \leq c \leq 13$.

EFFECTS OF THE INVENTION

According to a lithium ion secondary battery of the present invention, the volume fractions of active material particles, a vacancy volume and conductive additive particles in an active material mixture layer can be set in the optimum range in accordance with a particle diameter of the active material particles, so that both of high volumetric power density and high volumetric energy density can be achieved. The problems, structures and effects other than the aforementioned ones will be clarified in the descriptions on the following embodiments.

DESCRIPTION OF A PREFERRED EMBODIMENT OF THE INVENTION

Figure 1:
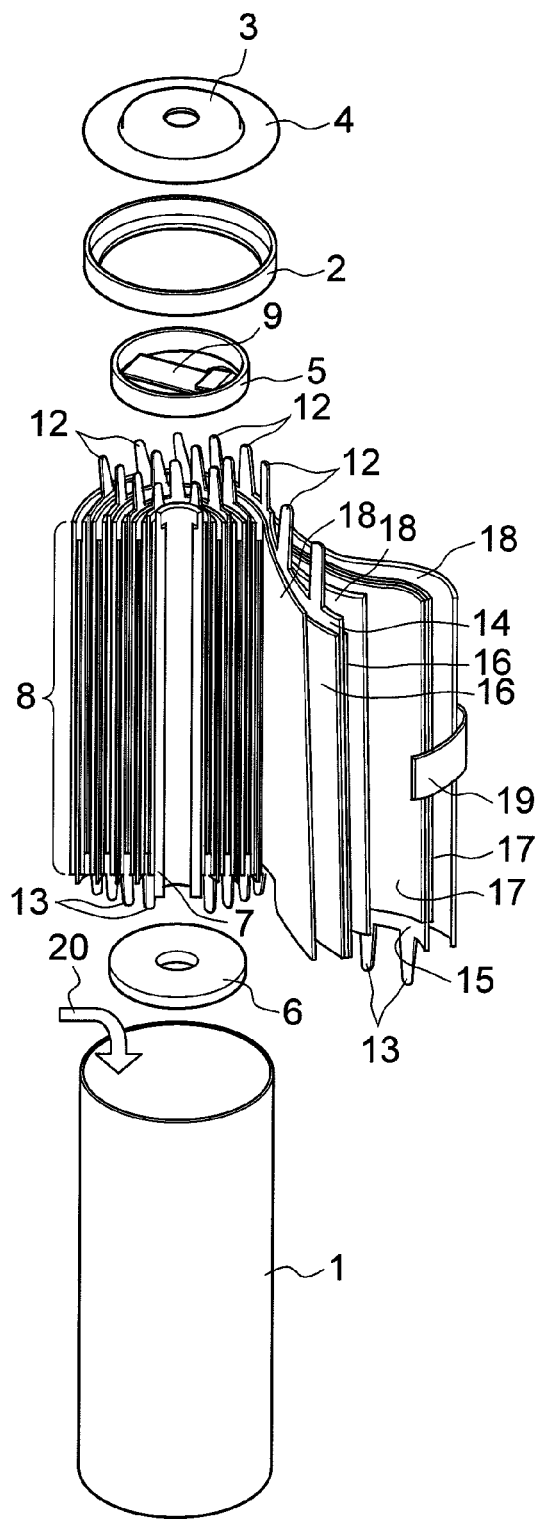
FIG. 1 is an exploded perspective view illustrating the overall structure of a lithium ion secondary battery of the present embodiment partially in cross section.

In a first embodiment of the present invention, a lithium ion secondary battery includes a positive electrode having a current collector with a positive active material mixture layer applied on both faces thereof, the positive active material mixture layer including positive active material particles, conductive additive particles and a binder, where the positive active material particles have the value D μm of an average particle diameter D50 in the range of 1 μm≤D≤10 μm, and the ratio (hereinafter called a ratio b/a) of volume fractions between the active material particles and the vacancy volume making up the positive active material mixture layer is set as in the range of the following Expression (1):

$$-0.01D+0.57 \leq b/a \leq 0.01D+0.97 \qquad \text{Expression (1)},$$

where a denotes a volume % of the volume fraction of the active material particles and b denotes a volume % of the volume fraction of the vacancy volume.

Not enough volume of the vacancy with reference to the volume of the active material particles making up the positive active material mixture layer means a decreased amount of electrolyte solution in the vicinity of the active material in the mixture layer. As a result, a chemical reactive area between the active material and the electrolyte solution decreases, so that resistance of a battery increases and volumetric power density thereof decreases. Further the distribution of electrolyte solution becomes nonuniform, and therefore partial imbalance occurs in the electrode reaction, which further decreases volumetric power density.

Conversely excessive volume of the vacancy with reference to the volume of the active material will cause not only little improvement in volumetric power density but also a decrease in the ratio of positive active material mixture and accordingly a decrease in volumetric power density. Therefore it can be considered that an optimum ratio is available between the volume of the active material particles and the volume of the vacancy.

As a result of further investigations based on the aforementioned consideration, the present inventors found that a lithium ion secondary battery with high volumetric power density can be obtained by specifying the relationship among the particle diameter of the active material particles, the volume fraction a of the active material particles and the volume fraction b of the vacancy volume and setting the ratio b/a of the volume fraction of the vacancy volume with reference to the volume fraction of the active material particles at the range of Expression (1).

The optimum range of the ratio b/a varies with the particle diameter of the active material particles because the number of active material particles per unit volume changes with the particle diameter of the active material, resulting in a change of a surface area (reactive area contributing to the reaction with electrolyte solution) and accordingly a change in the required volume of the vacancy.

According to the first embodiment of the present invention, the relationship among the average particle diameter D of the active material particles, the volume fraction a of the active material particles and the volume fraction b of the vacancy volume is set within a predetermined range as shown in Expression (1). Thereby, the vacancy volume with reference to the active material particles volume can be set within an adequate right amount of range in accordance with the average particle diameter of the active material particles, and the vacancy volume of the mixture layer can be filled with the adequate amount of electrolyte solution that promotes a chemical reaction with the active material. As a result, a lithium ion secondary battery with high volumetric power density can be obtained.

According to a second embodiment of the present invention, the positive active material particles have the value D μm of an average particle diameter D50 in the range of 1 μm≤D≤10 μm, and the following relationships are set for the volume fractions of the active material particles, the vacancy volume and the conductive additive particles making up the positive active material mixture layer:

$$-0.01D+0.57 \leq b/a \leq 0.01D+0.97 \qquad \text{Expression (1)},$$

where a denotes a volume % of the volume fraction of the active material particles, and b denotes a volume % of the volume fraction of the vacancy volume,
and $$-0.7D+13 \leq c \leq 13 \qquad \text{Expression (2)},$$

where c denotes a volume % of the volume fraction of conductive additive particles.

In order to obtain a lithium ion secondary battery with high volumetric energy density, it is effective to configure a conductive network in a mixture layer required to maintain volumetric power density using minimum conductive additive particles so as to increase the volume fraction of active material particles.

The volume fraction of the conductive additive particles required to form a conductive network varies with the particle diameter of the active material particles. As the particle diameter of the active material particles increases, the number of the active material particles per unit volume in an electrode decreases, and therefore the volume fraction of the conductive additive particles to form a conductive network can be made small.

On the other hand, as the particle diameter of the active material particles decreases, the reactive area of the active material particles can be easily increased and accordingly volumetric power density can be increased. A smaller particle diameter of the active material, however, increases the volume fraction of the conductive additive particles required to form a conductive network as described above.

The particle diameter of the active material can be freely selected with consideration given to the volume fraction of the conductive additive particles and the reactive area. In this respect, however, the value (hereinafter called D) of the average particle diameter D50 of the active material particles is desirably within the range of 1 μm to 10 μm. A too small D generates reaggregation of particles and a too large D means rough particles, which leads to the tendency of nonuniform application face of the mixture.

As a result of further investigations based on the aforementioned consideration, the present inventors found that a lithium ion secondary battery with high volumetric energy density as well as high volumetric power density can be obtained by setting the ratio b/a of the volume fraction of the vacancy volume with reference to the volume fraction of the active material particles in the range of Expression (1) and setting the volume fraction c of the conductive additive particles in the range of Expression (2).

For instance, when the average particle diameter D50 is 10 μm, the volume fraction c of the conductive additive particles is set at 6 volume %, and when the average particle diameter D50 is 1 μm, the volume fraction c of the conductive additive particles is set at 12 volume %. Thereby, a minimum volume of the conductive additive particles required to form a conductive network can be obtained, and volumetric power density of the battery will not be impaired. At this time, the volume fraction c is set in the range of 13 volume % or lower, whereby a lithium ion secondary battery with high volumetric energy density while maintaining high volumetric power density can be obtained.

The effects from these first and second embodiments are not limited to kinds of an active material used. However, the effects can be more exerted when lithium transition metal composite oxides are used as the active material. The lithium transition metal oxides have high volume specific resistance because it is an oxide, and therefore in order to achieve a battery with higher volumetric power density, a lot of conductive additive particles have to be used. Accordingly, the minimum volume fraction of the conductive additive particles is used so as not to impair the volumetric power density, whereby excellent effects can be obtained.

Among the lithium transition metal composite oxides, the active material represented by the chemical formula of $Li_aNi_xMn_yCo_{1-x-y}O_2$ ($0<a<1.3$, $0<x\leq0.6$, $0<y<0.5$) is preferably used with consideration given to balance among volumetric energy density, volumetric power density, safety and cost.

The following describes embodiments of a lithium ion secondary battery of the present invention, with reference to the drawings.

FIG. 1 is an exploded perspective view illustrating the overall structure of a lithium ion secondary battery partially in cross section.

A positive electrode 14 includes a metal thin film (positive current collector) made of aluminum, for example, with a positive active material mixture 16 applied on both faces thereof. At an upper long side part of the positive electrode in the drawing are provided a plurality of positive tabs 12. A negative electrode 15 includes a metal thin film (negative current collector) made of copper, for example, with a negative active material mixture 17 applied on both faces thereof. At a lower long side part of the negative electrode in the drawing are provided a plurality of negative tabs 13.

These positive electrode 14 and negative electrode 15 are wound around a winding core 7 made of resin via a porous and insulating separator 18, and the separator at the outermost part is fastened using a tape fastener 19, thus configuring an electrode group 8. At this time, the innermost part that is in contact with the winding core 7 is the separator 18, and the outermost part is the separator 18 covering the negative electrode 15.

At both ends of the tubular winding core 7 are engaged for fixing a positive current collector ring 5 and a negative current collector ring 6. To the positive current collector ring 5 is welded the positive tabs 12 by ultrasonic welding, for example. Similarly, to the negative current collector ring 6 is welded the negative tabs 13 by ultrasonic welding, for example.

Inside a casing 1 doubling as a negative terminal are housed the electrode group 8 wound around the winding core 7 made of resin as a shaft with the positive and negative current collector rings 5 and 6 attached thereto. The negative current collector ring 6 is electrically connected to the casing 1 via a negative lead (not illustrated). Thereafter electrolyte solution 20 is poured into the casing 1. Between the casing 1 and a top cover 4 is provided a gasket 2, and this gasket 2 seals an opening of the casing 1 and electrically insulates between the casing 1 and the top cover 4.

Above the positive current collector ring 5 is provided a top cover unit so as to seal the opening of the casing 1. The top cover unit is made of a conductive material, and includes a top cover 3 and the top cover 4. To the top cover 4 is welded one side of a positive lead 9 and to the positive current collector ring 5 is welded the other side of the positive lead 9, whereby the top cover unit and the positive electrode of the electrode group 8 are electrically connected.

(Positive Electrode)

As a positive active material, a lithium nickel manganese cobalt composite oxide ($LiNi_{0.33}Mn_{0.33}Cu_{0.33}O_2$) with a predetermined average particle diameter D50 is used.

Herein, the average particle diameter D50 is defined by a certain particle diameter when the number or the volume of particles with the particle diameter or larger accounts for 50% of that of the powder as a whole in the particle diameter distribution of the powder. The particle diameter may be measured by various methods, and in the embodiments it is measured by SEM. Since the shape of the particles is not uniform, a maximum length among any two-point distance on a contour of a particle is used as the particle diameter, and the average particle diameter is an average of the values from 30 particles. Although the positive active material may be in the form of primary particles or secondary particles, the positive active material in the present embodiment includes secondary particles and the average particle diameter thereof is the average particle diameter of the secondary particles.

In order to obtain the positive electrode, firstly, graphite particles and acetylene black particles as the conductive additive particles and polyvinylidene fluoride (PVDF) as the binder are added at a predetermined ratio, to which N-methyl-pyrrolidone as a dispersion solvent is added, followed by kneading to obtain slurry as a positive active material mixture. This slurry as the positive active material mixture is applied to both faces of aluminum foil with a thickness of 20 μm, for example, as a positive current collector by transferring in a roll-to-roll manner, followed by drying, whereby a substantially uniform and homogeneous positive active material mixture layer is formed on the aluminum foil. Thereafter, the positive active material mixture layer is pressed at a predetermined pressing pressure by a roll pressing machine so as to adjust the film thickness of the mixture layer to any thickness.

The volume fraction a of the active material particles, the volume fraction b of the vacancy volume and the volume fraction c of the conductive additive particles making up the positive active material mixture layer after pressing can be adjusted by the values of physical density of the respective materials, the mixture ratio and the thickness of the mixture layer after pressing. After pressing, the mixture layer is cut by adjusting the length of the electrode so that the diameter of the wound electrode group becomes constant at 35 mm, for example to obtain a belt-like positive electrode as a target.

(Negative Electrode)

As a negative active material, amorphous carbon powder with an average particle diameter of 7 μm is used. 10 parts by mass of polyvinylidene fluoride (PVDF) as a binder is added to 100 parts by mass of the negative active material, to which N-methyl-pyrrolidone as a dispersion solvent is added, followed by kneading to obtain slurry as a negative active material mixture. This slurry as the negative active material mixture is applied to both faces of rolled steel foil with a thickness of 10 μm, for example, as a negative current collector by transferring in a roll-to-roll manner, followed by drying, whereby a substantially uniform and homogeneous negative active material mixture layer is formed on the copper foil. Thereafter, the negative active material mixture layer is pressed at a predetermined pressing pressure by a roll pressing machine so as to adjust the film thickness of the mixture layer to any thickness. After pressing, the mixture layer is cut at a fixed ratio in accordance with the electrode length of each positive electrode to be combined therewith to obtain a belt-like negative electrode as a target.

(Battery Assembly)

The thus prepared positive and negative electrodes are wound with a separator made of polyethylene with a thickness of 40 μm to manufacture an electrode group, and this electrode group is inserted into a cylindrical casing, to which a predetermined amount of electrolyte solution is poured. Thereafter, the top cover thereof is sealed by swaging to complete a lithium ion secondary battery. As the electrolyte solution, 1 mol/liter of lithium hexafluorophosphate ($LiPF_6$) dissolved in a mixture solution of ethylene carbonate and dimethyl carbonate is used.

EXAMPLES

The following describes lithium ion secondary batteries as examples that were manufactured by appropriately changing the volume fraction of the active material particles, the volume fraction of the vacancy volume and the volume fraction of the conductive additive particles making up the positive active material mixture layer in accordance with the present embodiment. Batteries as comparative examples manufactured for comparison are described as well.

Figure 2:
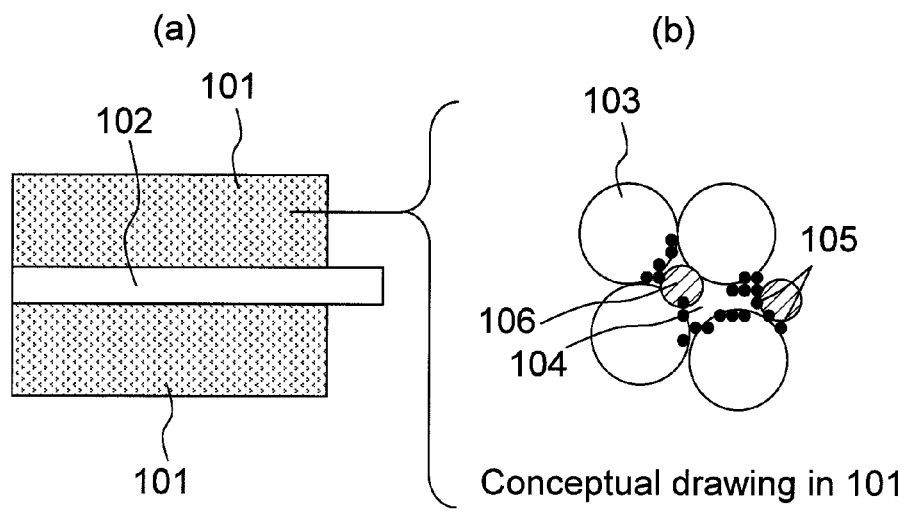
FIG. 2 describes the volume fractions of materials making up a positive active material mixture layer.

FIG. 2 is a conceptual drawing to describe the volume fraction of each material making up the positive active material mixture layer.

As illustrated in FIG. 2(a), the positive electrode is configured so that a positive active material mixture layer 101 is formed on both faces of a positive current collector 102 made of aluminum foil. As illustrated in FIG. 2(b), the volume of the positive active material mixture layer 101 equals the sum of each volume of active material particles 103, a vacancy volume 104, conductive additive particles 105 and a binder 106 included in the positive active material mixture layer 101. The volume fractions are defined as the ratios of the volume of these materials and the vacancy volume to the overall volume of the positive active material mixture layer, where the overall volume of the positive active material mixture layer 101 is 100%.

First Embodiment

Firstly, as the first embodiment, the range of the ratio b/a of the volume fraction of the vacancy volume (hereinafter called b) with reference to the volume fraction of the active material particles (hereinafter called a) leading to lithium ion secondary batteries with high volumetric power density was examined, and the results thereof are shown as Examples 1 to 10 in the following Tables 1 and 2 together with Comparative Examples 1 to 8.

Example 1

As shown in Table 1, in Example 1, a battery was manufactured by adjusting the mixture ratio of the materials and the film thickness after pressing so that the average particle diameter of the active material was 1 μm, the ratio b/a was 0.55 and the volume fraction (hereinafter called volume fraction c) of the conductive additive particles was 15 volume %.

TABLE 1

| Embodiments | | D50 of active material D | Gap/active material b/a ratio | Volume fractions in electrode Conductive additive c[Volume %] |
|---|---|---|---|---|
| First embodiment | Example 1 | 1 | 0.55 | 15.1 |
| | Example 2 | 1 | 0.70 | 15 |
| | Example 3 | 1 | 0.90 | 15.2 |
| | Example 4 | 1 | 1.00 | 14.9 |
| | Example 5 | 7 | 0.49 | 15 |
| | Example 6 | 7 | 0.70 | 15.1 |
| | Example 7 | 7 | 0.90 | 15.2 |
| | Example 8 | 10 | 0.45 | 14.8 |
| | Example 9 | 10 | 0.70 | 15.1 |
| | Example 10 | 10 | 0.90 | 15 |
| | Comp. example 1 | 1 | 0.40 | 15.2 |
| | Comp. example 2 | 1 | 1.25 | 15 |
| | Comp. example 3 | 7 | 0.40 | 14.9 |
| | Comp. example 4 | 7 | 1.00 | 15 |
| | Comp. example 5 | 7 | 1.25 | 15.1 |
| | Comp. example 6 | 10 | 0.40 | 15 |
| | Comp. example 7 | 10 | 1.00 | 15.1 |
| | Comp. example 8 | 10 | 1.25 | 15 |
| Second embodiment | Example 11 | 1 | 0.62 | 13.1 |
| | Example 12 | 1 | 0.61 | 12.1 |
| | Example 13 | 7 | 0.62 | 13 |
| | Example 14 | 7 | 0.61 | 7.9 |
| | Example 15 | 10 | 0.63 | 13.2 |
| | Example 16 | 10 | 0.62 | 5.9 |
| | Comp. example 9 | 1 | 0.61 | 14.9 |
| | Comp. example 10 | 1 | 0.62 | 10.1 |
| | Comp. example 11 | 7 | 0.62 | 15 |
| | Comp. example 12 | 7 | 0.62 | 6.9 |
| | Comp. example 13 | 10 | 0.63 | 15.1 |
| | Comp. example 14 | 10 | 0.62 | 5.1 |

Examples 2 to 4

As shown in Table 1, Examples 2 to 4 were manufactured similarly to Example 1 except that the ratio b/a was changed in the range of about 0.7 to 1.0.

Comparative Examples 1, 2

As shown in Table 1, Comparative Examples 1 and 2 were manufactured similarly to Example 1 except that the ratio b/a was 0.40 and 1.25, respectively.

Examples 5, 6, 7

As shown in Table 1, Examples 5, 6 and 7 were manufactured similarly to Example 1 except that the average particle diameter D of the active material was 7 μm and the ratio b/a was changed in the range of about 0.5 to 0.9.

Comparative Examples 3, 4, 5

As shown in Table 1, Comparative Examples 3, 4 and 5 were manufactured similarly to Example 5 except that the ratio b/a was 0.4, 1 and 1.25, respectively.

Examples 8, 9, 10

As shown in Table 1, Examples 8, 9 and 10 were manufactured similarly to Example 1 except that the average particle diameter D of the active material was 10 μm and the ratio b/a was changed in the range of about 0.45 to 0.9.

Comparative Examples 6, 7, 8

As shown in Table 1, Comparative Examples 6, 7 and 8 were manufactured similarly to Example 8 except that the ratio b/a was changed to be about 0.4, 1.0 and 1.25, respectively.

Second Embodiment

Subsequently as the second embodiment, the value of a minimum volume fraction c capable of maintaining high volumetric power density and the range of the volume fraction c capable of achieving high volumetric energy density with reference to the average particle diameter D of the active material were examined, and the results thereof are shown as Examples 11 to 16 in the following Tables 1 and 2 together with Comparative Examples 9 to 14.

Examples 11, 12

As shown in Table 1, lithium ion secondary batteries as Examples 11 and 12 were manufactured by adjusting the mixture ratio of the materials and the film thickness after pressing so that the volume fraction c of the conductive additive particles was 13 volume % and 12 volume %, respectively, where the average particle diameter D of the active material was 1 µm and the ratio b/a was 0.62.

Comparative Examples 9, 10

As shown in Table 1, Comparative Examples 9 and 10 were manufactured similarly to Example 11 except that the volume fraction c was changed to be 15 volume % and 10 volume %, respectively.

Examples 13, 14

As shown in Table 1, Examples 13 and 14 were manufactured similarly to Example 11 except that the average particle diameter D of the active material was 7 µm and the ratio b/a was 0.62 and the volume fraction c of the conductive additive particles was changed to be 13 volume % and 8 volume %, respectively.

Comparative Examples 11, 12

As shown in Table 1, Comparative Examples 11 and 12 were manufactured similarly to Example 13 except that the volume fraction c of the conductive additive particles was changed to be 15 volume % and 7 volume %, respectively.

Examples 15, 16

As shown in Table 1, Examples 15 and 16 were manufactured similarly to Example 11 except that the average particle diameter D of the active material was 10 µm and the ratio b/a was 0.62 and the volume fraction c of the conductive additive particles was changed to be 13 volume % and 6 volume %, respectively.

Comparative Examples 13, 14

As shown in Table 1, Comparative Examples 13 and 14 were manufactured similarly to Example 15 except that the volume fraction c was changed to be 15 volume % and 5 volume %, respectively.

(Test Method)

Next, as for the batteries as the thus manufactured Examples and Comparative Examples, charge was performed at a room temperature and then the discharge capacities thereof were measured to calculate volumetric energy density with reference to the battery volume for comparison.

The charge was performed at a constant voltage of 4.1 V and a constant charge current of 0.25 C. The discharge was performed at a constant current of 1 C and a termination voltage of 2.5 V. The volumetric energy density was calculated by the following Expression (3).

$$\text{Volumetric energy density}[Wh/l] = \text{energy}[Wh]/\text{battery volume}[l] \quad \text{Expression (3),}$$

where energy [Wh]=discharge average voltage×discharge capacity, and discharge average voltage=3.6 V.

Next, as for the batteries as Examples and Comparative Examples, DC resistance thereof was measured to calculate volumetric power density with reference to the battery volume for comparison. The volumetric power density was calculated by the following Expression (4). Voltage was measured when discharging was performed from the full charge state of 4.1 V for 5 seconds at 1 A, for 5 seconds at 3 A and for 5 seconds at 6 A in the atmosphere of −30° C., and the absolute value of the gradient of a straight line obtained by straight-line approximation using a least squares method based on the relationship of the voltage values to the current values was used as the DC resistance A in Expression (4). The DC resistance A was measured after initial stabilization.

$$\text{Output}[W] = (\text{discharge start voltage} - \text{minimum voltage})/\text{DC resistance } A \times \text{minimum voltage} \quad \text{Expression (4),}$$

where volumetric power density [W/l]=output [W]/battery volume [l], discharge start voltage=4.1 V and minimum voltage=2.5 V.

(Test Result)

Figure 5:
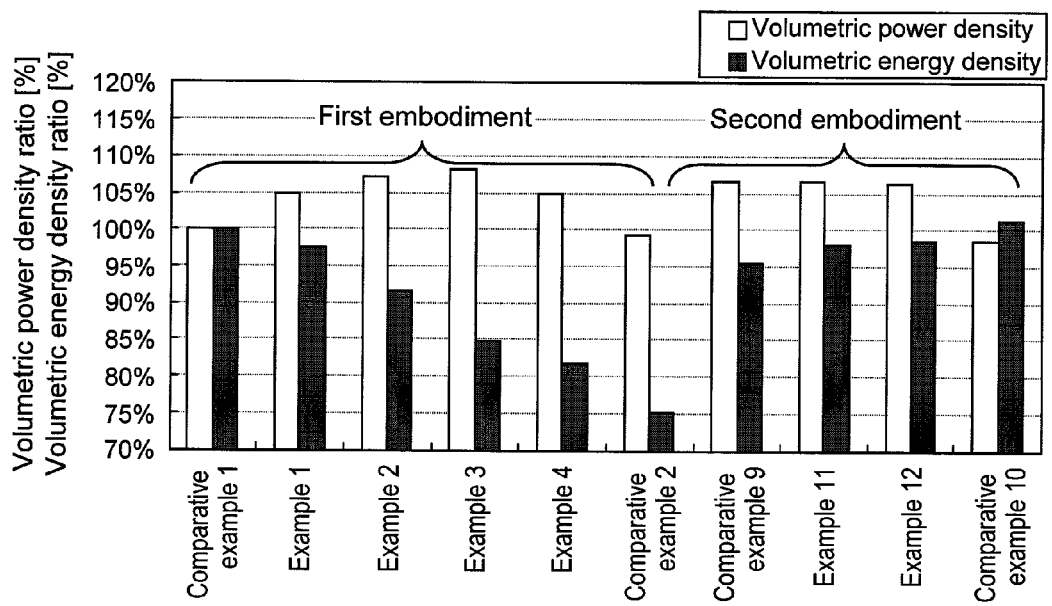
FIG. 5 is a graph illustrating the relationship among the battery characteristics of Examples and Comparative Examples in the first and second embodiments where the average particle diameter D of the active material is 1 μm.
Figure 6:
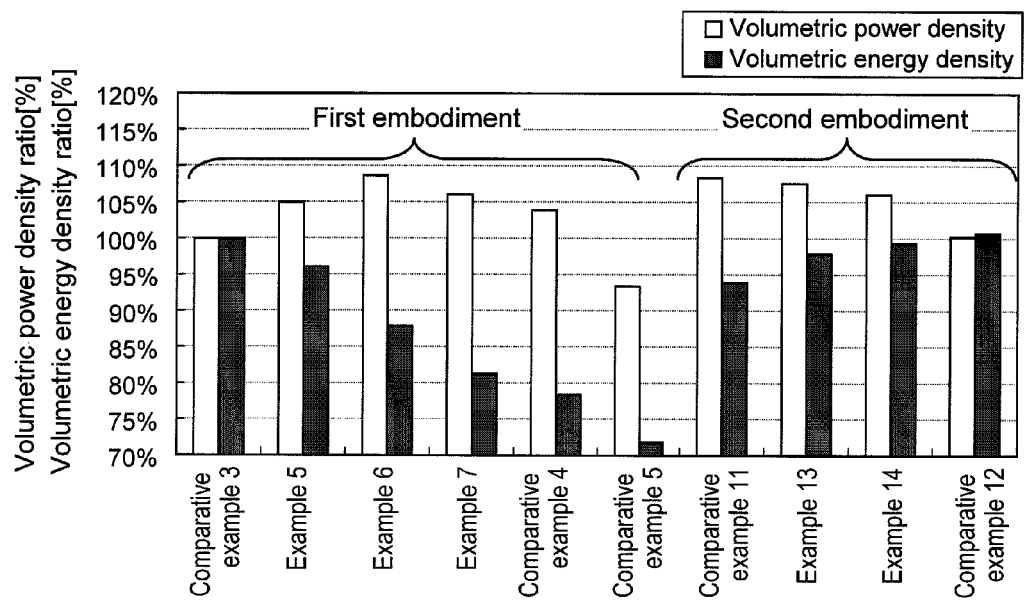
FIG. 6 is a graph illustrating the relationship among the battery characteristics of Examples and Comparative Examples in the first and second embodiments where the average particle diameter D of the active material is 7 μm.
Figure 7:
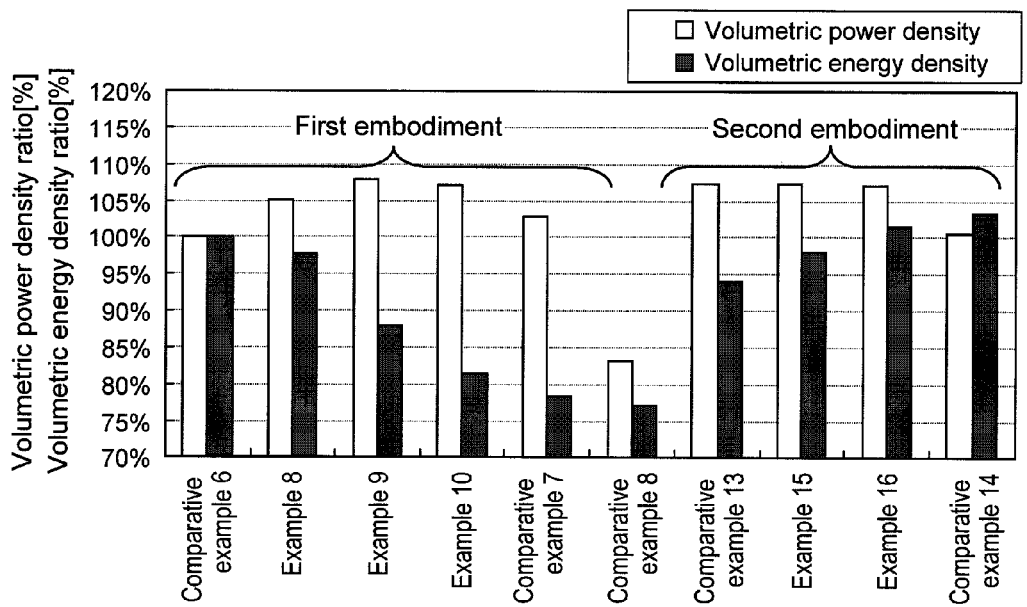
FIG. 7 is a graph illustrating the relationship among the battery characteristics of Examples and Comparative Examples in the first and second embodiments where the average particle diameter D of the active material is 10 μm.

The following Table 2 as well as FIGS. 5, 6 and 7 illustrate the results of a series of these tests. Table 2 shows the test results of Examples 1 to 4, 11 and 12 and Comparative Examples 1, 2, 9 and 10 using the active material particles with the particle diameter of 1 µm, which were subjected to normalization where the test result of Comparative Example 1 was set at 100%. Similarly, as for the test results of the particle diameter of 7 µm and the particle diameter of 10 µm, the results subjected to normalization using the results of Comparative Example 3 and Comparative Example 6, respectively, set at 100% are shown.

TABLE 2

Figure 3:
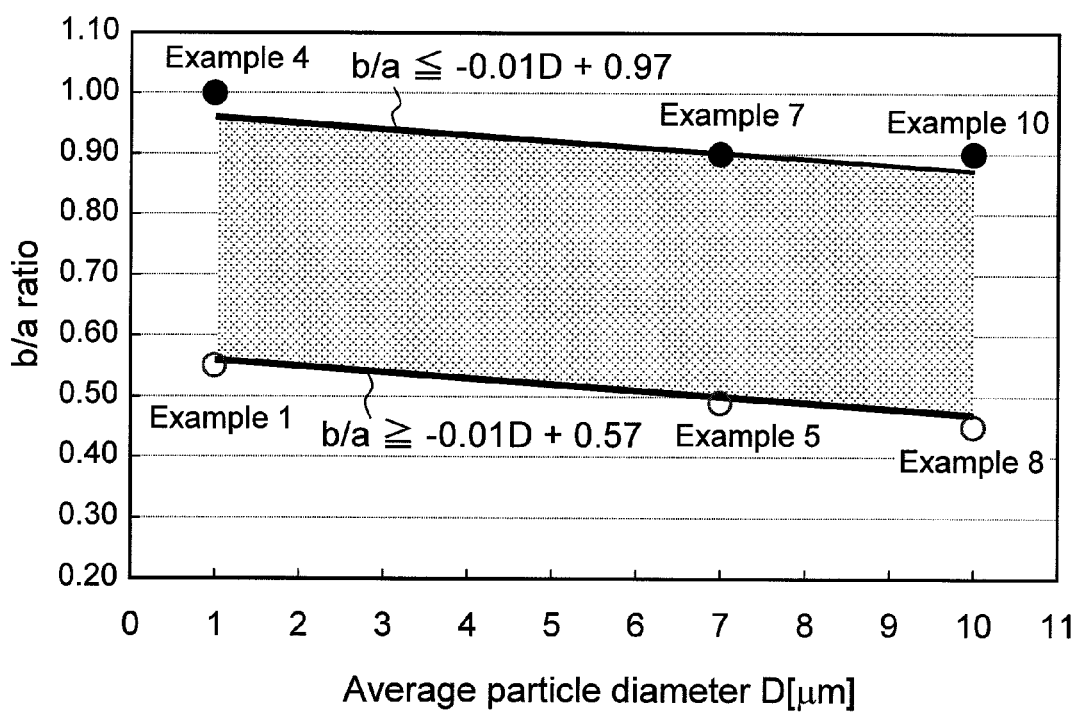
FIG. 3 is a graph illustrating a preferable range of the ratio b/a that is the ratio of the volume fraction of the vacancy volume with reference to the volume fraction of the active material particles versus the values of average particle diameter D of the active material.

| | | D50 of active material D | Volume fractions in electrode | | Battery performance comparison [%] | | Reference FIG. |
|---|---|---|---|---|---|---|---|
| | | | Gap/active material b/a ratio | Conductive additive c [Volume %] | Volume output density | Volume energy density | |
| First embodiment | Comp. example 1 | 1 | 0.40 | 15.2 | 100% | 100% | FIG. 5 |
| | Example 1 | 1 | 0.55 | 15.1 | 105% | 98% | FIG. 3 |
| | Example 2 | 1 | 0.70 | 15 | 107% | 92% | |
| | Example 3 | 1 | 0.90 | 15.2 | 108% | 85% | |
| | Example 4 | 1 | 1.00 | 14.9 | 105% | 82% | |
| | Comp. example 2 | 1 | 1.25 | 15 | 99% | 75% | |

TABLE 2-continued

Figure 4:
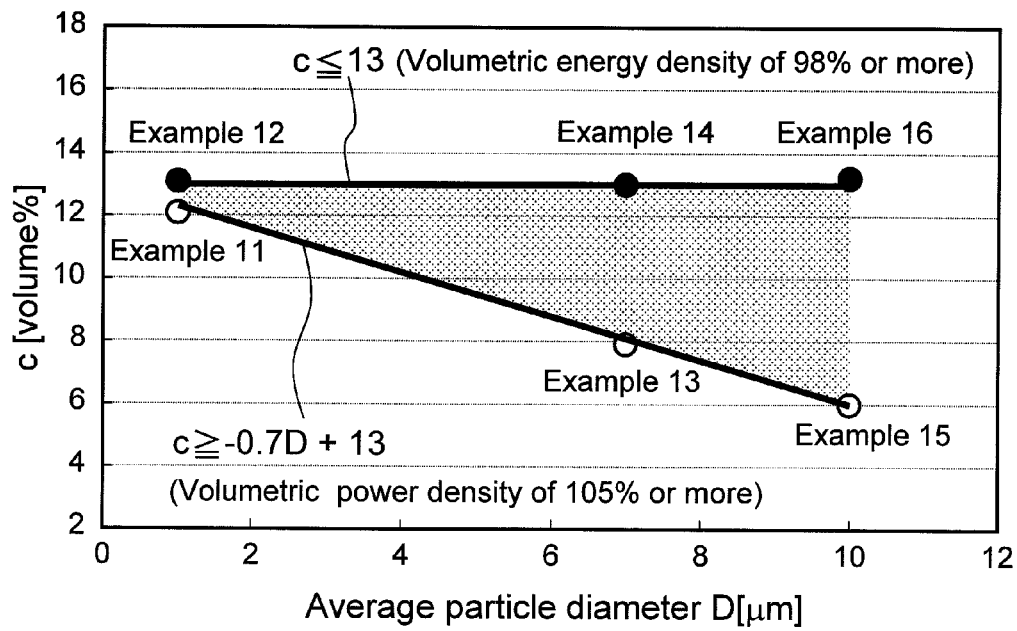
FIG. 4 is a graph illustrating a preferable range of the volume fraction c of the conductive additive particles versus the values of average particle diameter D of the active material.

| | Embodiments | D50 of active material D | Volume fractions in electrode | | Battery performance comparison [%] | | Reference FIG. |
|---|---|---|---|---|---|---|---|
| | | | Gap/active material b/a ratio | Conductive additive c [Volume %] | Volume output density | Volume energy density | |
| Second embodiment | Comp. example 9 | 1 | 0.61 | 14.9 | 107% | 96% | |
| | Example 11 | 1 | 0.62 | 13.1 | 107% | 98% | FIG. 4 |
| | Example 12 | 1 | 0.61 | 12.1 | 106% | 99% | |
| | Comp. example 10 | 1 | 0.62 | 10.1 | 99% | 101% | |
| First embodiment | Comp. example 3 | 7 | 0.40 | 14.9 | 100% | 100% | FIG. 6 |
| | Example 5 | 7 | 0.49 | 15 | 105% | 96% | FIG. 3 |
| | Example 6 | 7 | 0.70 | 15.1 | 109% | 88% | |
| | Example 7 | 7 | 0.90 | 15.2 | 106% | 81% | |
| | Comp. example 4 | 7 | 1.00 | 15 | 104% | 78% | |
| | Comp. example 5 | 7 | 1.25 | 15.1 | 93% | 72% | |
| Second embodiment | Comp. example 11 | 7 | 0.62 | 15 | 108% | 94% | |
| | Example 13 | 7 | 0.62 | 13 | 108% | 98% | FIG. 4 |
| | Example 14 | 7 | 0.61 | 7.9 | 106% | 100% | |
| | Comp. example 12 | 7 | 0.62 | 6.9 | 100% | 101% | |
| First embodiment | Comp. example 6 | 10 | 0.40 | 15 | 100% | 100% | FIG. 7 |
| | Example 8 | 10 | 0.45 | 14.8 | 105% | 98% | FIG. 3 |
| | Example 9 | 10 | 0.70 | 15.1 | 108% | 88% | |
| | Example 10 | 10 | 0.90 | 15 | 107% | 81% | |
| | Comp. example 7 | 10 | 1.00 | 15.1 | 103% | 78% | |
| | Comp. example 8 | 10 | 1.25 | 15 | 83% | 77% | |
| Second embodiment | Comp. example 13 | 10 | 0.63 | 15.1 | 107% | 94% | |
| | Example 15 | 10 | 0.63 | 13.2 | 107% | 98% | FIG. 4 |
| | Example 16 | 10 | 0.62 | 5.9 | 107% | 102% | |
| | Comp. example 14 | 10 | 0.62 | 5.1 | 100% | 103% | |

Firstly the verification results of the first embodiment are described below.

As shown in Table 2 as well s FIGS. 5, 6 and 7, as for all of the average particle diameters D of 1, 7 and 10 μm, as the ratio b/a increased from 0.40 used for normalization, the volumetric power density resulted in an increase once and a decrease again.

Conceivably this result shows that when the volume of the vacancy is not enough for the volume of the active material particles in the positive active material mixture layer, DC resistance increases because the reactive area between the positive active material and the electrolyte solution decreases and because nonuniform distribution of the electrolyte solution causes partial imbalance in the chemical reaction. On the other hand, when the volume of the vacancy is too large for the volume of the positive active material particles, the ratio of the positive active material mixture decreases and accordingly the reactive area decreases, and therefore DC resistance increases and volumetric power density decreases.

FIG. 3 illustrates the ratio b/a that can realize the volumetric power density of 105% or more for each active material particle diameter. As illustrated in the shaded part of FIG. 3, the relationship of Expression (1) holds in the range of the ratio b/a that can realize the volumetric power density of 105% or more for the average particle diameter D of the active material particles.

$$-0.01D+0.57 \leq b/a \leq -0.01D+0.97 \quad \text{Expression (1)}.$$

It was found that electrodes may be designed so as to achieve the ratio b/a given by the above Expression (1) for the average particle diameter D of the active material particles to be used, whereby a lithium ion secondary battery with high volumetric power density can be obtained.

Next the verification results of the second embodiment are described below.

As shown in Table 2 as well s FIGS. 5, 6 and 7, as for all of the average particle diameters D of 1, 7 and 10 μm, a decrease in the volume fraction c of the conductive additive particles resulted in that the range leading to substantially constant volumetric power density existed and then the volumetric power density decreased sharply. Further a larger particle diameter resulted in substantially constant volumetric power density with less volume fraction c of the conductive additive particles. Conceivably this results from that a larger particle diameter of the active material particles means less active material particles in number per unit volume in the electrodes, and so the volume fraction of the conductive additive particles to form a conductive network directly coupling with the DC resistance of the battery was made small.

When a conductive network in the mixture layer required to maintain the volumetric power density is configured with minimum conductive additive particles, the volume fraction of the active material particles can be relatively increased. Therefore such a configuration is effective for higher volumetric energy density of a lithium ion secondary battery.

FIG. 4 illustrates the range of the volume fraction c (volume %) of the conductive additive particles that can maintain the volumetric power density of 105% or more and at the same time can realize the volumetric energy density of 98% or more that is comparable to those of Comparative Examples on the basis of the ratio b/a of 0.40 and the volume fraction c of 15 volume % that are used for the normalization of the respective particle diameters.

It was found that the volume fraction c of the conductive additive particles in the range of:

$$-0.7D+13 \leq c \leq 13$$

to the average particle diameter D of the active material particles could form a conductive network with minimum amount of the conductive additive and could realize a lithium ion secondary battery with the volumetric power density of 105% or more as well as with high volumetric energy density.

As stated above, according to the present invention, the average particle diameter D of the active material particles, the volume fraction b of the vacancy volume and the volume fraction a of the active material particles are set so as to satisfy the following range of:

$$-0.01D+0.57 \leq b/a \leq -0.01D+0.97.$$

Thereby, the vacancy volume with reference to the active material particles volume can be set within an adequate right amount of range in accordance with the average particle diameter of the active material particles, and the vacancy volume of the mixture layer can be filled with the adequate amount of electrolyte solution that promotes a chemical reaction with the active material. As a result, a lithium ion secondary battery with high volumetric power density can be obtained.

Additionally, the relationship between the average particle diameter D of the active material particles and the volume fraction c of the conductive additive particles is set in the following:

$$-0.7D+13 \leq c \leq 13.$$

Thereby, the volume of the conductive additive particles can be set at an adequate and right value to form a conductive network in the mixture layer, and minimum electrode resistance that does not adversely affect the DC resistance of the battery can be obtained. As a result, excessive volume of the conductive additive particles that does not contribute to the improvement in volumetric power density can be used to increase the filling ration of the active material, and so a lithium ion secondary battery with high volumetric energy density can be obtained while maintaining the volumetric power density thereof.

The present invention is not limited to the configurations of the aforementioned Examples, and can be modified variously in the range without departing from the scope of the present invention.

In the present embodiments, a lithium nickel manganese cobalt composite oxide ($LiNi_{0.33}Mn_{0.33}Co_{0.33}O_2$) was used as the positive active material, graphite and acetylene black were used as the positive conductive additive particles, PVDF was used as the binder, amorphous carbon powder was used as the negative active material, and hexafluorophosphate dissolved in a mixture solution of ethylene carbonate and dimethyl carbonate was used as the electrolyte solution. However, any one of the following materials that are typically used in the aforementioned scope of the invention can be used as described in detail in the following.

The positive active material exemplified in the present embodiments has the ratio 1:1:1 of Ni/Mn/Co in the lithium nickel manganese cobalt composite oxide, which is not limited thereto. The Li/(Ni+Mn+Co) ratio exemplified in the present embodiments is 1.0, but is no limited thereto, and may be Li excessive.

A lithium transition metal composite oxide represented by the chemical formula of $Li_aNi_xMn_yCo_{1-x-y}O_2$, ($0<a<1.2$, $0<x \leq 0.6$, $0<y<0.5$) may be used. Further, a composite oxide of Co and Ni or a lithium transition metal composite oxide where a part of Mn, Co and Ni is substituted with or doped with at least one type of elements including Li, Co, Ni, Mn, Fe, Cu, Al, Cr, Mg, Zn, V, Ga, B and F may be used, for example.

Examples of the binder that can be used instead of the aforementioned binder in the present embodiments include a polymer such as polytetrafluoroethylene (PTFE), polyethylene, polystyrene, polybutadiene, butyl rubber, nitrile rubber, styrene/butadiene rubber, polysulfide rubber, nitrocellulose, cyanoethyl cellulose, various types of latex, acrylonitrile, vinyl fluoride, vinylidene fluoride, propylene fluoride or chloroprene fluoride or a mixture of them.

The positive conductive material that can be used instead of those in the present embodiments also is not limited especially. Examples thereof include a carbonaceous material such as natural graphite, artificial various types of graphite or coke. The particle shape thereof may be any one of a scale shape, a spherical shape, a fiber shape and a block shape, or amorphous carbon such as ketjen black or acetylene black may be used. The negative conductive material that can be used instead of those in the present embodiments also is not limited especially, and examples thereof include graphite carbon.

As the electrolyte solution, a typical lithium salt may be used as electrolyte, which may be dissolved into an organic solvent. The lithium salt and the organic solvent to be used also are not limited especially. Examples of the electrolyte include, in addition to that in the present embodiment, $LiClO_4$, $LiAsF_6$, $LiBF_4$, $LiB(C_6H_5)_4$, $CH_3SO_3L_1$ and $CF_3SO_3Li$ and a mixture thereof.

Examples of the organic solvent other than that in the present embodiments include propylene carbonate, diethyl carbonate, 1,2-dimethoxyethane, 1,2-diethoxyethane, γ-butyrolactone, tetrahydrofuran, 1,3-dioxolane, 4-methyl-1,3-dioxolane, diethyl ether, sulfolane, methylsulfolane, acetonitrile and propionitrile or a mixture solvent including two types or more of them. The mixture ratio also is not limited especially.

In the present embodiments, the volume fractions of the materials making up the electrodes are set and calculated by adjusting the physical density of the respective materials, the mixture ratio thereof and the thickness of the mixture layer after pressing. The following further describes one exemplary method to find the volume fractions of the respective materials making up the electrode with reference to the electrode volume from the finished electrode.

The physical density of the active material and the conductive additive particles can be decided by analysis such as XPS, XRD or SEM to understand the composition and the shape thereof. As for the binder, the component can be found by GC-MS, and the physical density can be decided therefrom. The mixture ratio thereof may be measured using TG-MS or the like. In this way, the physical density and the mixture ratio of the active material particles, the conductive additive particles and the binder making up the electrode can be found, and therefore each volume fraction in the volume of the electrode as a whole can be found using these data together with the thickness of the electrode.

What is claimed is:
1. A lithium ion secondary battery, comprising a positive electrode including a current collector with a positive active material mixture layer applied thereon, the positive active material mixture layer including:
   active material particles;
   conductive additive particles comprising a carbonaceous material; and
   a binder,
      wherein the ranges of 1 μm≤D≤10 μm,
      $-0.01D+0.57 \leq b/a \leq -0.01D+0.97$ hold, and
      $-0.7D+13 \leq c \leq 13$,
      where D denotes a value of an average particle diameter D50 of the active material particles,
      a denotes a volume % of a volume fraction of the active material particles in the positive active material mixture layer, b denotes a volume % of a volume fraction of a vacancy volume in the positive active material mixture layer and c denotes a volume % of a volume fraction of the conductive additive particles in the positive active material mixture layer.

2. The lithium ion secondary battery according to claim 1, wherein the active material particles comprise a lithium transition metal composite oxide.

3. The lithium ion secondary battery according to claim 2, wherein the lithium transition metal composite oxide is represented by a chemical formula of $Li_aNi_xMn_yCo_{1-x-y}O_2$ ($0<a<1.3$, $0<x\leq0.6$, $0<y<0.5$).

* * * * *